United States Patent [19]
Shioji et al.

[11] Patent Number: 5,268,778
[45] Date of Patent: Dec. 7, 1993

[54] LIQUID CRYSTAL DISPLAY WITH ONE LIGHT SHIELD BETWEEN COLOR FILTERS AND SECOND LIGHT SHIELD BETWEEN FILTER ELEMENTS

[75] Inventors: Mitsuaki Shioji, Nara; Kunihiko Ito, Yamatokoriyama; Hiroshi Fukutani; Kazuhiko Akimoto, both of Nara, all of Japan

[73] Assignee: Sharp Kabushiki Kaisha, Osaka, Japan

[21] Appl. No.: 781,410

[22] Filed: Oct. 23, 1991

[30] Foreign Application Priority Data

Nov. 9, 1990 [JP] Japan ................. 2-305012

[51] Int. Cl.⁵ ............... G02F 1/1335; G02F 1/1343
[52] U.S. Cl. ........................... 359/67; 359/68; 359/89
[58] Field of Search .................. 359/67, 68, 89

[56] References Cited

U.S. PATENT DOCUMENTS

| | | | |
|---|---|---|---|
| 4,410,887 | 10/1983 | Stolov et al. | 359/67 |
| 4,653,862 | 3/1987 | Morozumi | 359/67 |
| 4,957,350 | 9/1990 | Ito et al. | 359/68 |
| 5,045,418 | 9/1991 | Fukuyoshi | 359/68 |
| 5,079,214 | 1/1992 | Long et al. | 359/68 |
| 5,128,786 | 7/1992 | Yanagisawa | 359/68 |

FOREIGN PATENT DOCUMENTS

| | | |
|---|---|---|
| 0179915 | 5/1986 | European Pat. Off. |
| 59-208530 | 11/1984 | Japan .................. 359/68 |
| 0210325 | 9/1986 | Japan .................. 359/67 |
| 1-113725 | 5/1989 | Japan . |
| 1-113726 | 5/1989 | Japan . |
| 2-273722 | 11/1990 | Japan . |

Primary Examiner—William L. Sikes
Assistant Examiner—Anita Pellman Gross

[57] ABSTRACT

A liquid crystal display apparatus includes light shielding members provided longitudinally and latitudinally throughout the whole face of one transparent base plate out of a pair of base plates to be provided oppositely with a liquid crystal layer being disposed therebetween, having constant width and pitch, transparent conductive members provided on the liquid crystal layer side, of the above described one pair of light transparent base plate. It is characterized in that the non-display portion provided on the transparent base plate is provided with the light shielding member, with the above-described liquid crystal layer being disposed therebetween, and is overlapped by the light shielding member so as not to protrude from the above described light shield member.

4 Claims, 2 Drawing Sheets

LIQUID CRYSTAL DISPLAY WITH ONE LIGHT SHIELD BETWEEN COLOR FILTERS AND SECOND LIGHT SHIELD BETWEEN FILTER ELEMENTS

BACKGROUND OF THE INVENTION

The present invention generally relates to a liquid crystal display apparatus.

Generally, in a liquid crystal display apparatus, overlapping portions which are opposite portions with a liquid crystal layer being sandwiched therebetween become display patterns. Segment (hereinafter SEG side) transparent electrodes and Common (hereinafter COM side) transparent electrodes are respectively provided on a pair of transparent base plates provided oppositely with a liquid crystal layer being sandwiched therebetween. The above described SEG side transparent and COM side transparent electrodes are composed of the above described overlapping portions and a non-display portion (hereinafter referred to as "mantle portion") not for display, with the above described liquid crystal layer being sandwiched therebetween, of the above described SEG side transparent electrodes and COM side transparent electrodes. When the above described liquid crystal display apparatus is of a normally white construction, the above described display patterns become whitish when a voltage is not applied on the above described SEG side transparent electrodes and the above described COM side transparent electrodes. Further the above described display patterns become blackish when a voltage is applied on the above described SEG side transparent electrodes and the above described COM side transparent electrodes. In the case of the above described normally white construction, the display of the liquid crystal layer opposite to the above described mantle portion is normally whitish regardless of the application of the above described voltage. In the case of the above described normally white construction, the contrast of the above described display pattern is high, while the visually recognizable angle of vision of the above described display pattern is narrow. When the above described liquid crystal display apparatus is composed of a normally black construction, the above described display patterns becomes blackish if the voltage is not applied upon the above described SEG side transparent electrodes and the above described COM side transparent electrodes. The above described display patterns become whitish if the voltage is applied upon the above described SEG side transparent electrodes and the above described COM side transparent electrodes. In the case of the above described normally black construction, the display of the liquid crystal layer opposite to the above described mantle portion normally remains blackish regardless of the application of the above described voltage. In the case of the above described normally black construction, the contrast of the above described display pattern is low, while the visually recognizable angle of vision of the above described display pattern is wider.

Conventionally the liquid crystal display apparatus cannot make the background of the above described display patterns blackish, because the display of the above described mantle portion normally remains whitish in the case of normally white construction with the contrast of the display pattern being high. Also, the background of the above described display patterns cannot be made whitish, because the display of the above described mantle portion normally remains blackish of the above described mantle portion in the case of the normally black construction with the visual angle capable of visually recognizing the display patterns being wide.

SUMMARY OF THE INVENTION

Accordingly, the present invention has been developed with a view to substantially eliminating the above discussed drawbacks inherent in the prior art and has, for one of its essential objects to provide an improved liquid crystal display apparatus.

Another important object of the present invention is to provide an improved liquid crystal display apparatus which is wider in the application range, and which can make the background of the display patterns blackish in the case of the normally white construction, and also, can make the background of the display pattern whitish in the case of the normally black construction.

In accomplishing these and other objects, according to one preferred embodiment of the present invention, there is provided a liquid crystal display apparatus which includes light shielding members having constant width and pitch and provided longitudinally and latitudinally throughout the whole face, on the side adjacent to the above described liquid crystal layer, of one transparent base plate out of a pair of transparent base plates to be provided oppositely with the liquid crystal layer being disposed therebetween, and transparent conductive members provided on the above described liquid crystal layer side of the above described one pair of transparent base plates. Further, the opposite (display) portions of the transparent conductive members are adapted to change the orientation condition of the above described liquid crystal layer with electric signals. Further, the non-opposite (non-display) portions provided on the transparent base plate are overlapped by the above described light shielding member so as not to protrude from the above described light shielding member.

A plurality of stripe shaped color filters which are equal in pitch and different in color are provided on the light shielding base plate on which the above described light shielding member is provided. The above described light shielding member is desirably composed of narrow-width masks having a pitch the same as that of the above described color filters, and provided longitudinally and latitudinally between the above described adjacent color filter. It further includes thick-width masks provided longitudinally and latitudinally, having a pitch an integral multiple of the pitch of the above described color filters, and a width an integral multiple of the pitch of the above described color filters, and a width larger than the minimum value of the width of the non-display portion of the above described transparent conductive member.

According to the above described construction, the non-display portion of the transparent conductive member provided on the transparent base plate is overlapped by the above described light shielding base plate so as not to protrude from the above described light shielding member, so that the normally white display of the liquid crystal layer opposite to the above described non-display portion is covered with the above described light shielding member in the case of the normally white construction. Therefore, the patterns for background use surrounding the display pattern by the above described display portions are provided to put the patterns for the background use normally in an on condition so that the background of the above described display pattern becomes blackish. In the case of the normally black construction, the normally black display of the liquid crystal layer opposite to the above described non-display portion is normally covered with the light shielding member. The patterns for background use surrounding the display pattern by the above described display portion are provided so as to put the background patterns normally in an on condition, so that the background of the above described display patterns becomes whitish except for the portion the above described light shielding members. The above described light shielding members are longitudinally and latitudinally provided with constant width and pitch on the whole face adjacent to the above described liquid crystal layer of the above described one light transparent base plate, so that the existence of the above described length shielding members with respect to the above described white background is not conspicuous. According to the above described construction, in the case of the normally white construction with the contrast of the display pattern being high, it is possible to make the background of the display patterns blackish. It is possible to make the background of the display pattern whitish in the case of the normally black construction with the visually recognizable angle of vision of the display pattern being wide.

A plurality of stripe shaped color filters which are different in color and uniform in pitch are provided on the transparent base plate provided with the above described light shielding member. The above described light shielding member is composed of width-narrow masks provided longitudinally and latitudinally between the above described adjacent color filters, having the pitch the same as that of the above described color filters, and width-thick masks provided longitudinally and latitudinally, having width of an integral multiple as long as the pitch of the above described color filters and width larger than the minimum value of the width of the non-opposite portion of the above described transparent conductive member, so that the color display may be effected.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
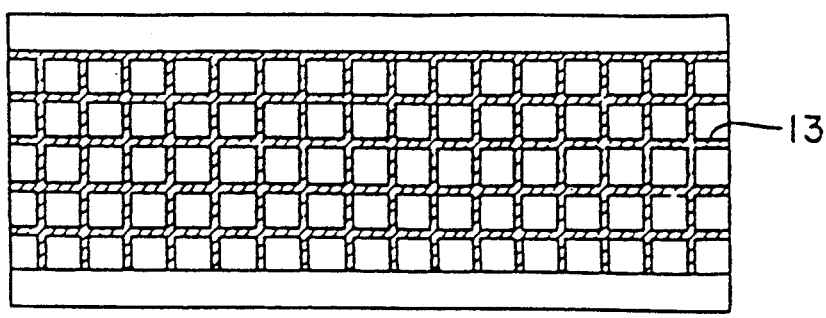
FIG. 1 is a plan view in one embodiment where color filters of a liquid crystal display apparatus of the present invention are not provided.

Before the description of the present invention proceeds, it is to be noted that like parts are designated by like reference numerals throughout the accompanying drawings.

The present invention will be described in detail with reference to the illustrated embodiments.

Figure 2:
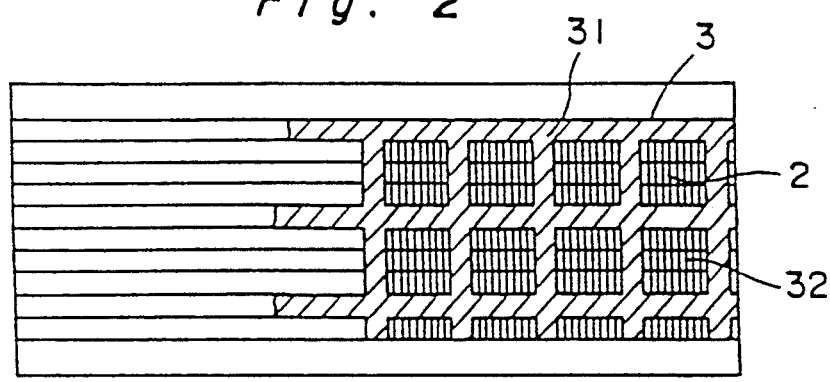
FIG. 2 is a plan view in one embodiment where the color filters of a liquid crystal display apparatus of the present invention are provided.
Figure 3:
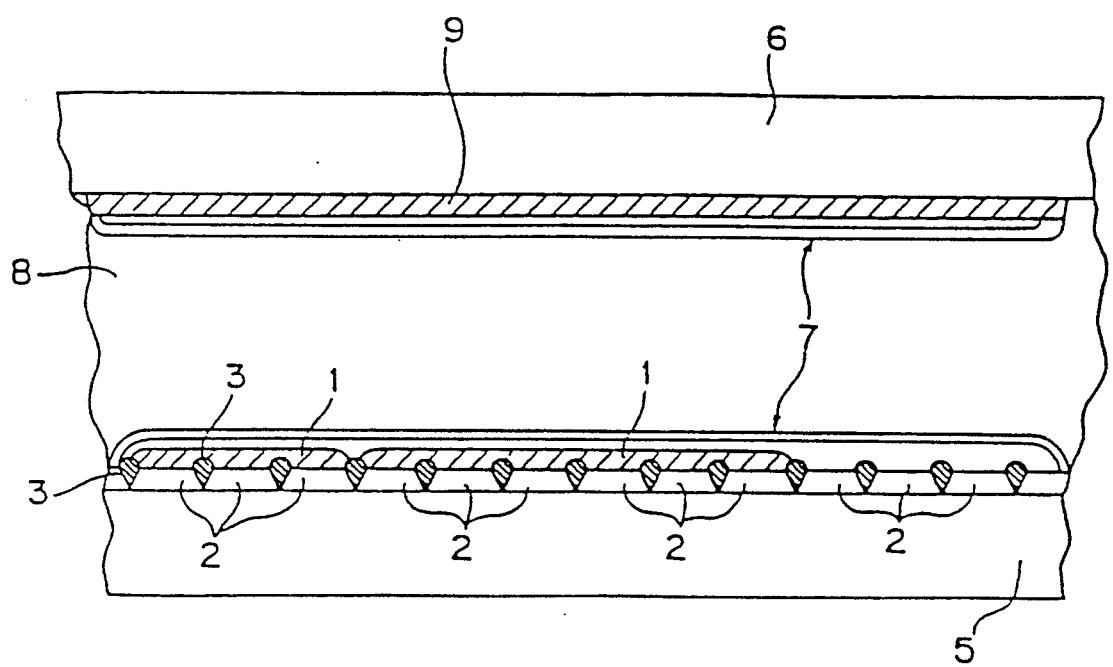
FIG. 3 is a sectional view in the above described embodiment.
Figure 4:
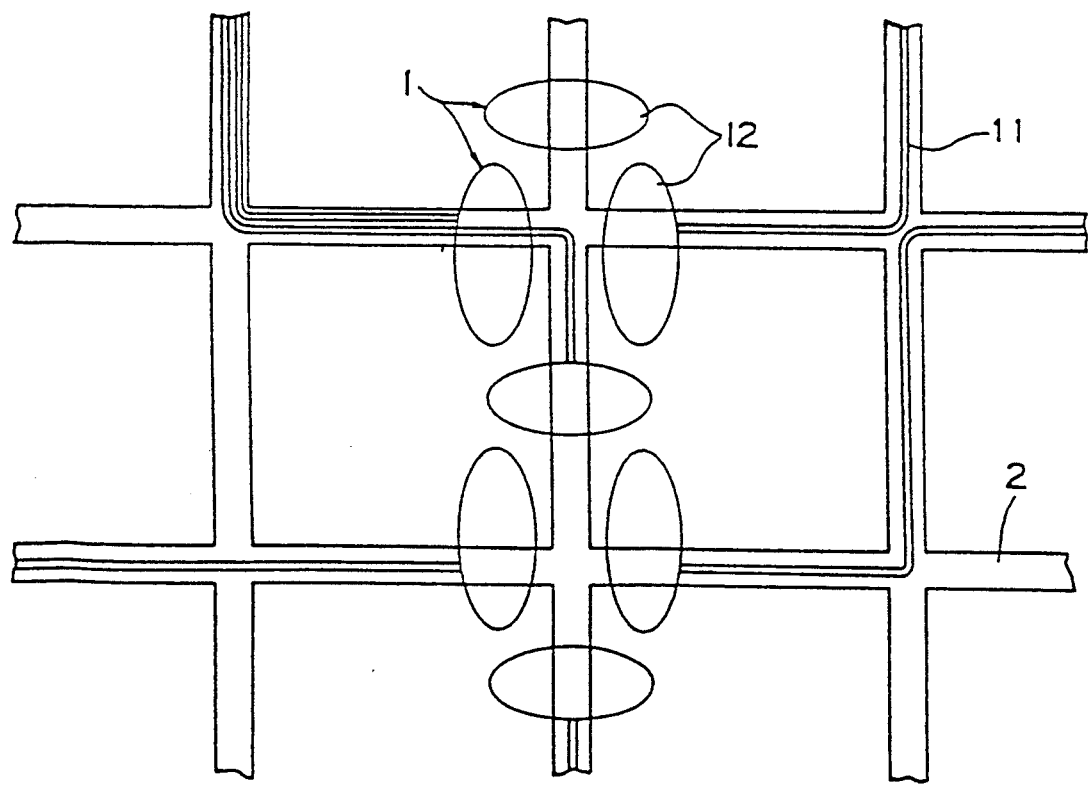
FIG. 4 is an enlargement view in the above described embodiment.

FIG. 3 is a sectional view in one embodiment of a liquid crystal display apparatus of the present invention. The above described embodiment is provided with a transparent base plate 5 on the SEG side and a transparent base plate 6 on the COM side, each provided oppositely with respect to a liquid crystal layer 8 provided therebetween as shown in FIG. 3. An orientation member 7 for setting the initial orientation condition of the above described liquid crystal layer 8 is provided on the surface of the above described liquid crystal layer 8. The transparent base plate 5 on the above described SEG side has a plurality of filters 2 different in color, stripe masks 3 as light shielding members, and transparent conductive members 1 on the SEG side formed on it. The above described transparent base plate 6 on the COM side has transparent conductive members 9 on the COM side formed on it. As shown in FIG. 2, the above described stripe masks 3 are provided longitudinally and latitudinally throughout the whole face on a side of the transparent base plate 5 on the above described SEG side, adjacent to the liquid crystal layer. The above described color filters 2 are provided in a stripe shape in uniform pitches on the face on a side, adjacent to the liquid crystal layer 8, of the transparent base plate 5 on the side of the above described SEG. The above described stripe mask 3 is composed of narrow-width masks 32 provided longitudinally and latitudinally among the above described adjacent color filters 2, having pitch the same as that of the pitch of the above described color filters 2, and thick-width masks 31 provided longitudinally and latitudinally having pitch which is an integral multiple as long as a pitch of the above described color filters 2 and having width an integral multiple as long as the pitch of the above described color filters 2. As shown in FIG. 4, the transparent conductive member 1 on the side of the above described SEG is composed of opposite portions 12, the 7 display segments as shown in FIG. 4 for providing a 7-segment display for example, forming display patterns in opposite to the transparent conductive member 9 on the above described COM side and mantle portions 11, which are the non-opposite portion and are not for display, not opposite to the transparent conductive member 9 on the above described COM side. The mantle portions are small electrode portions leading to the display portions of the segment electrodes, and are not for display. The above described mantle portions 11 are overlapped on the above described stripe masks 3 so as not to protrude from the thick-width masks 31 of the above described stripe masks 3. Assuming that the width of the above described mantle portion 11 is W, and the overlapped position shift width between the above described masks 31 and the above described mantle portions 11 is X, the width of the above described thick-width mask 31 is required to be W+(2×X) or more. The pitch of the thick width masks 31 is required to be made smaller as the number of the above described mantle portions 11 are increased.

The above described liquid crystal display apparatus is adapted to color-display the above described display patterns through the variation in the orientation condition of the above described liquid crystal layer 8 by the application of the voltage upon the transparent conductive member 1 on the above described SEG side and the transparent conductive member 9 on the COM side. The above described mantle portion 11 is narrower than the thick-width mask 31 of the above described stripe mask 3 and is adapted not to protrude from the above described thick-width mask 31, so that the normal white display of the liquid crystal display of the liquid crystal layer 8 opposite to the above described mantle portion 11 is covered with the above described thick-width masks 31 the case of the normally white construction. The patterns for background use surrounding the above described display pattern are provided so as to normally put the background patterns in an on condition so that the background of the above described display patterns may be made blackish. In the case of the normally white display with the contrast of the display pattern being high, the background of the display patterns may be made blackish. The normal black display of the liquid crystal liquid 8 opposite to the above described mantle portion 11 is covered with the above described thick-width mask 31 in the case of the normally black construction. The patterns for background use surrounding the above described display pattern are provided so as to normally put the background patterns in the on condition, so that the background of the above described display patterns becomes whitish, except for the portions of the above described stripe masks 3. The above described stripe mask 3 is composed of narrow-width masks 32 and thick-width masks 31. As the above described narrow-width masks 32 and the thick-width masks 31 respectively have equal pitches so as to effect longitudinal and latitudinal extensions, the existence of the above described stripe masks 3 with respect to the above described white background is not conspicuous. In the case of the normally black display with the angle of vision where the display patterns can be visually recognizable, the background of the display patterns can be made whitish.

A plan view of an embodiment which is not provided with color filters is shown in FIG. 1. The embodiment is different from the above described embodiment in that the color filters 2 in the above described embodiment are not provided, and the stripe mask 3 in the above described embodiment is composed of thick-width masks 13 provided longitudinally and latitudinally, having constant width and pitch, without having narrow-width masks 32 provided longitudinally and latitudinally among the color filters 2. Therefore, the points different from those in the above described embodiment will be described hereinafter.

As in the embodiment, the present invention can be applied even to the liquid crystal display apparatus which is not provided with color filters.

As is clear from the foregoing description, according to the arrangement of the present invention, non-opposite portion not opposite to the transparent conductive member provided on the transparent base plate where the above described light shielding member is not provided with the above described liquid crystal layer being inserted therebetween, of the transparent conductive member provided on transparent base plate provided with the above described light shielding member is not overlapped on the above described light shielding member so as not to protrude from the above described light shielding member. Thus, the normally white display of the liquid crystal layer opposite to the above described non-opposite portion is covered with the above described light shielding member in the case of the normally white construction. Therefore, the patterns for background use surrounding the display pattern by the above described opposite portions are provided to put the patterns for the background use normally in an on condition so that the background of the above described display pattern can be made blackish. In the case of the normally black construction, the normally black display of the liquid crystal layer opposite to the above described non-opposite portion is normally covered with the light shielding member. The patterns for background use surrounding the display pattern by the above described opposite portion are provided so as to put the background patterns normally in an on condition, so that the background of the above described display patterns can be made whitish except for the portion of the above described light shielding members. The above described light shielding members are longitudinally and latitudinally provided with constant width and pitch on the whole face on the side adjacent to the above described liquid crystal layer of the above described one light transparent base plate, so that the existence of the above described light shielding members with respect to the above described white background is not conspicuous. According to the present invention, in the case of the normally white construction with the contrast of the display pattern being high, it is possible to make the background of the display patterns blackish. It is possible to make the background of the display pattern whitish in the case of the normally black construction with the visually recognizable angle of vision of the display pattern being wide, thus realizing a liquid crystal display apparatus wider in the application range.

A plurality of stripe shaped color filters which are different in color and uniform in pitch are provided on the transparent base plate provided with the above described light shielding member. The above described light shielding member is composed of narrow-width masks provided longitudinally and latitudinally between the above described adjacent color filters, having the pitch the same as that of the above described color filters, and thick-width masks provided longitudinally and latitudinally, having widths which are an integral multiple as long as the pitch of the above described color filters and widths larger than the minimum value of the width of the non-opposite portion of the above described transparent conductive member, so that the color display may be effected.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A liquid crystal display apparatus with a segment format comprising:
   first and second transparent base plates with a liquid crystal provided therebetween;
   a plurality of multi-color filters, each including a plurality of elements of different colors, disposed on a liquid crystal side of the first transparent base plate;
   a plurality of first light shielding members, one being disposed between each adjacent pair of the plurality of elements of each of the multi-color filters;
   a plurality of second light shielding members, one being disposed between each adjacent pair of the multi-color filters; and transparent conductive members disposed on the first transparent base plate, said transparent conductive members including a first portion for display in the segment format and a second portion, connected to the first portion for non-display, wherein said plurality of second light shielding members are disposed so as to shield light from the second portions of the transparent conductive members and thereby render them non-displayable.

2. The liquid crystal display of claim 1, wherein the plurality of first light shielding members are of a relatively narrow width in relation to the plurality of second light shielding members.

3. The liquid crystal display of claim 1, wherein the display is a normally white display.

4. The liquid crystal display of claim 1, wherein the display is a normally black display.

* * * * *